United States Patent

Okigami et al.

[11] Patent Number: 6,118,219
[45] Date of Patent: Sep. 12, 2000

[54] AC DRIVER HAVING THREE POWER SUPPLY VOLTAGES INCLUDING AN INTERNALLY GENERATED VOLTAGE

[75] Inventors: Tomio Okigami, Tanashi; Shozo Ochiai, Tokyo, both of Japan

[73] Assignees: Citizen Watch Co., Ltd.; New Japan Radio Co., Ltd., both of Tokyo, Japan

[21] Appl. No.: 08/535,143

[22] PCT Filed: Feb. 23, 1995

[86] PCT No.: PCT/JP95/00270

§ 371 Date: Oct. 20, 1995

§ 102(e) Date: Oct. 20, 1995

[87] PCT Pub. No.: WO95/23359

PCT Pub. Date: Aug. 31, 1995

[30] Foreign Application Priority Data

Feb. 23, 1994 [JP] Japan .................................. 6-047928

[51] Int. Cl.[7] .................................................. G09G 3/10
[52] U.S. Cl. .................................. 315/169.3; 315/169.1
[58] Field of Search .............................. 315/169.7, 169.3, 315/169.1; 345/76

[56] References Cited

U.S. PATENT DOCUMENTS

| | | | |
|---|---|---|---|
| 3,995,177 | 11/1976 | Sirocks et al. | 307/264 |
| 4,527,096 | 7/1985 | Kindlmann | 315/169.3 |
| 5,103,387 | 4/1992 | Rosenbaum et al. | 363/21 |

FOREIGN PATENT DOCUMENTS

| | | |
|---|---|---|
| 0 467 667 A2 | 1/1992 | European Pat. Off. . |
| 53-107870 | 9/1978 | Japan . |
| 55-72889 | 6/1980 | Japan . |
| 56-125682 | 10/1981 | Japan . |
| 58-009392 | 2/1983 | Japan . |
| 3-214591 | 9/1991 | Japan . |
| 4-75294 | 3/1992 | Japan . |

OTHER PUBLICATIONS

Form PCT/ISA/210.

*Primary Examiner*—Michael B Shingleton
*Attorney, Agent, or Firm*—Finnegan, Henderson, Farabow, Garrett & Dunner, L.L.P.

[57] ABSTRACT

The present invention relates to an improvement in an EL driver including a second power supply voltage producer for producing second supply voltage for use in driving an EL lamp using a battery serving as a first power source, a third supply voltage producer for producing third supply voltage that is higher than the first supply voltage and lower than the second supply voltage, and a driving signal supplier for supplying an AC driving signal to an EL driving means when driven by the third supply voltage. The level of the AC driving signal is increased in two steps. The EL driver semiconductor device characteristic of the high-voltage efficiency and high threshold voltage can therefore be driven by low voltage.

20 Claims, 12 Drawing Sheets

AC DRIVER HAVING THREE POWER SUPPLY VOLTAGES INCLUDING AN INTERNALLY GENERATED VOLTAGE

TECHNICAL FIELD

The present invention relates to a driver for driving a driving unit designed to be driven by a high-voltage alternating current. More particularly, this invention is concerned with an improvement in a driver that must produce a high voltage from a low-voltage power source such as a battery so as to make an electroluminescent device, for small-sized electronic equipment, glow.

BACKGROUND ART

In recent years, diverse types of wristwatches, from medium-priced to low-priced types, have been introduced in an effort to cope with numerous market needs. With the spread of personal computers, a lamp based on an electroluminescent (hereinafter EL) device has evolved as a thin lamp for liquid-crystal displays. The EL lamp is thin, adopts of field emission, and has a beautiful glow color. Clocks, in which an EL lamp is incorporated and which have a digital, combination, or analog displays, have been put on the market as multi-function clocks.

Figure 2:
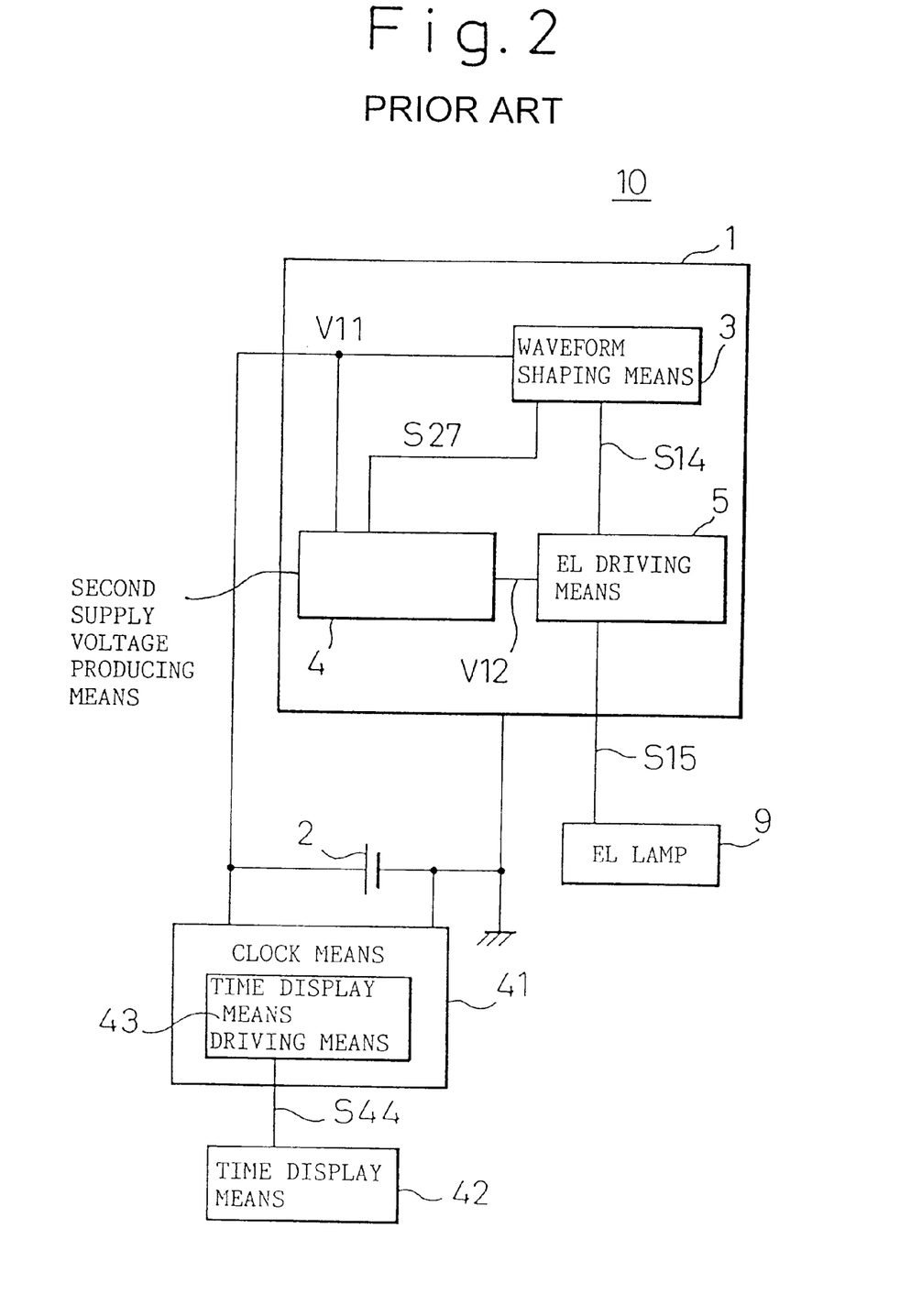
FIG. 2 is a block diagram showing the configuration of a known AC driver.

An example of the system configuration will be described in conjunction with a drawing. FIG. 2 shows an example of system configuration for an EL driver 1 including a clock mechanism with a known EL lamp. A general example of a system configuration for a clock is illustrated. Reference numeral 41 denotes a clock means. 42 denotes a time display means corresponding to a motor with indicators for an analog clock or a liquid-crystal display for a digital clock. 43 denotes a time display means driving means. S44 denotes a time display means driving signal that is provided by the time display means driving means 43. These components are involved in a time display in a clock. 1 denotes an EL driver. 2 denotes a battery serving as a first power source. 3 denotes a waveform shaping means. 4 denotes a second supply voltage producing means. 5 denotes an EL driving means. 9 denotes an EL lamp. The battery 2 serves as a first power source for the EL driver and a power source for the clock means 41. V11 denotes first supply voltage. V12 denotes second supply voltage. S14 is a driving input signal produced by the waveform shaping means 3. S15 denotes a driving output signal causing the EL lamp 9 to glow. S27 denotes a second supply voltage boosting signal produced by the waveform shaping means 3. The waveform shaping means 3 uses the first supply voltage 11 supplied from the battery 2 to produce the driving input signal S14 used for driving the EL lamp and the second supply voltage boosting signal S27. For causing the EL lamp to glow, alternating current (hereinafter AC) voltage having an amplitude of several tens of volts must be applied. The second supply voltage producing means 4 is used as a power source to produce the second supply voltage V12 for use in driving the EL lamp. The second supply voltage V12 is then fed to the EL driving means 5. The EL driving means 5 receives the driving input signal S14 from the waveform shaping means 3, produces the driving output signal S15 that is an AC signal having the same amplitude as the second supply voltage V12, applies the driving output signal S15 to the EL lamp 9, and thus causes the EL lamp 9 to glow.

Figure 3:
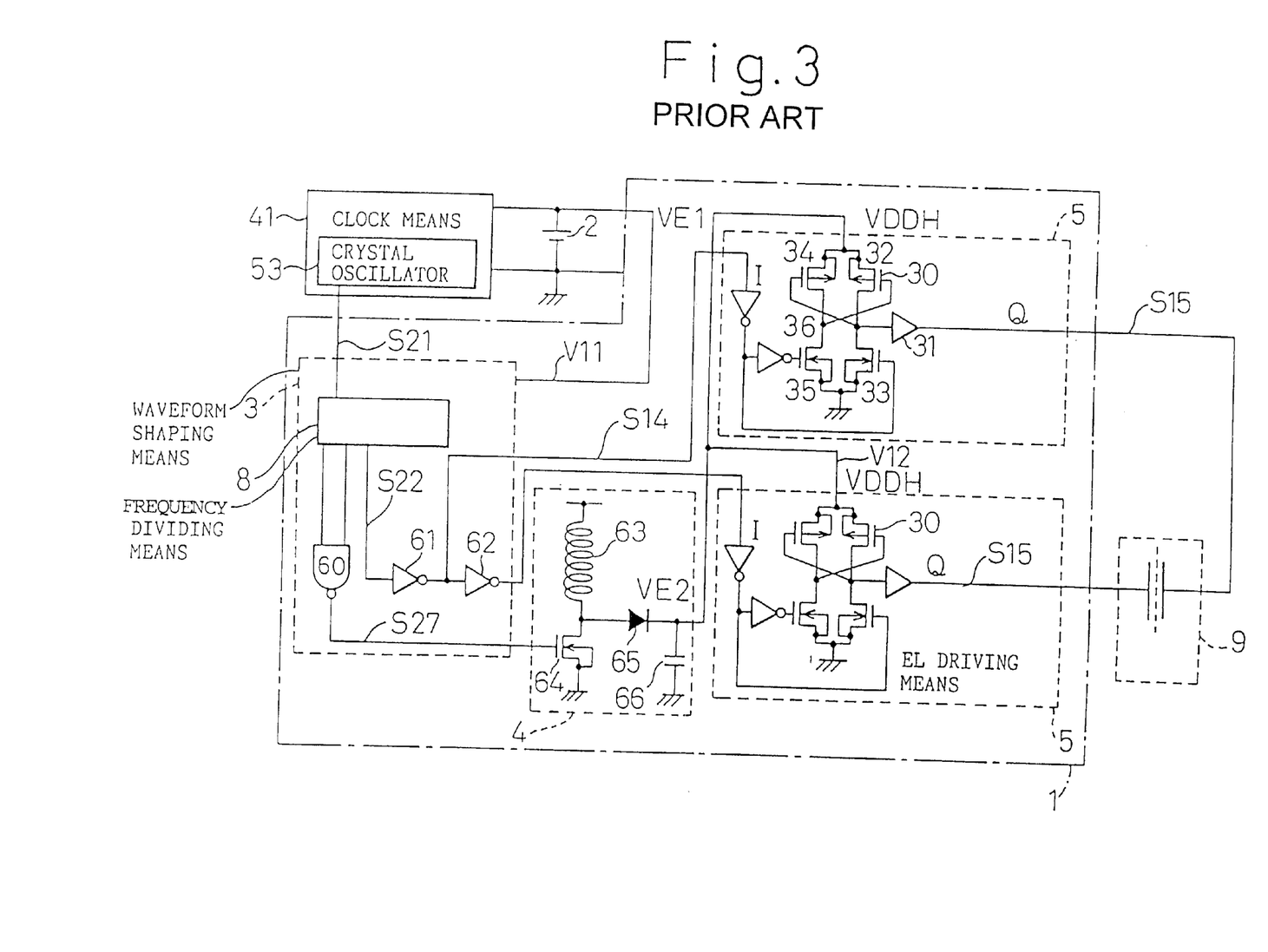
FIG. 3 is a block diagram showing the practical circuitry for an AC driver having the configuration shown in FIG. 2.
Figure 5:
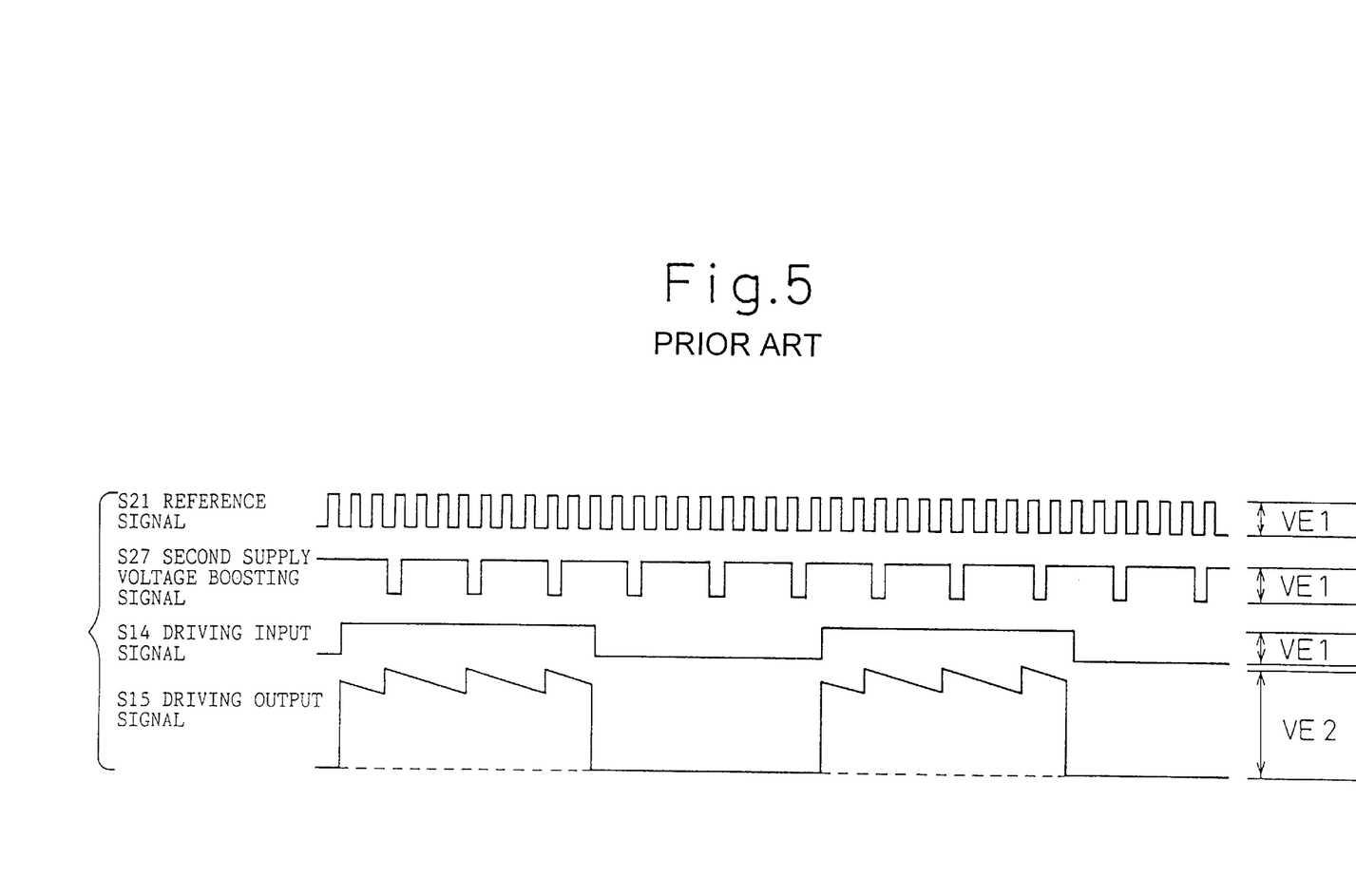
FIG. 5 is a timing chart concerning FIG. 3.

Next, the system configuration will be described in detail in conjunction with drawings. FIG. 3 is a schematic diagram showing the circuitry of a general example constructed according to the system configuration shown in FIG. 2. When a semiconductor device is used, a CMOS device will be adopted. FIG. 5 is a timing chart concerning FIG. 3. To begin with, the configuration will be detailed in conjunction with FIG. 3. Reference numeral 41 denotes a clock means for providing timing pulses for small-sized electronic equipment. 53 denotes a crystal oscillator for generating a reference signal for the clock means 41. S21 denotes a reference signal provided by the crystal oscillator.

Reference numeral 3 denotes a waveform shaping means composed of a frequency divider 8, a NAND 60, and inverters 61 and 62. S22 denotes a fraction signal provided by the frequency divider and fed to the NAND 60 and inverters 61 and 62. S27 is a second supply voltage boosting signal provided by the NAND 60. 4 denotes a second supply voltage producing means. S14 denotes a driving input signal provided by the inverters 61 and 62. 5 denotes an EL driving means. 30 denotes a level shifter constituting the EL driving means. V12 denotes a second supply voltage provided by the second supply voltage producing means 4 and fed to the EL driving means 5. S15 denotes a driving output signal provided by the EL driving means 5. 9 denotes an EL lamp. 64 denotes a switching transistor that inputs the second supply voltage boosting signal S27 through the gate thereof. 63 denotes an inductor. 65 denotes a diode. 66 denotes a smoothing capacitor. When the EL driver 1 is constructed with a semiconductor device, the inductor 63 and smoothing capacitor 66 are connected externally because they cannot be mounted or cannot be efficiently mounted in a semiconductor device.

Operations will be described in conjunction with FIGS. 3 and 5. The reference signal S21 provided by the crystal oscillator 53 in the clock means 41 is fed to the frequency dividing means 8, whereby a plurality of fraction signals with different frequencies are produced. The NAND 60 receives one of or a plurality of signals of several to several tens of kilohertz, and supplies the second supply voltage boosting signal S27. The frequency and duty ratio of the second supply voltage boosting signal S27 are set to the values permitting optimal boosting efficiency in the second supply voltage producing means 4. With the second supply voltage boosting signal S27, the switching transistor 64 is turned on or off so that the inductor 63 can generate a counter electromotive force. The backflow of the counter electromotive force generated by the inductor 63 is prevented by the diode 65. At the same time, the counter electromotive force is smoothed by the smoothing capacitor 66 so that it can be used as supply voltage for driving the EL lamp, and then fed to the EL driving means 5.

The inverter 61 receives a timing signal of several tens to several hundreds of hertz and produces a driving input signal S14. The two inverters 61 and 62 are mounted because push-pull configuration is adopted for driving the EL lamp 9. The EL lamp 9 is equivalent to a large capacitor in an electric circuit. When AC voltage is applied to both the electrodes of the EL lamp 9, the EL lamp 9 glows. For more efficient glowing, it is better to apply voltage to both the electrodes at intervals of several tens to several hundreds of hertz. For driving both the electrodes, two EL driving means 5 are needed. The voltages at the electrodes must be 180° out of phase. The driving input signal S14 has the same amplitude as the first supply voltage V11 (voltage level VE1). For driving the EL lamp, an AC voltage having the same amplitude as the second supply voltage V12 (voltage level VE2) is needed. The EL driving means 5 must therefore have the ability to upgrade the level of the driving input signal S14. The EL driving means 5 therefore has the level shifter 30 therein. As shown in FIG. 5, the driving input signal S14 fed to the level shifter 30 has the amplitude VE1. The amplitude VE1 is upgraded by the level shifter 30, so that the driving input signal S14 has the amplitude VE2. Having the amplitude VE2, the driving output signal S15 can drive the EL lamp 9 in terms of the voltage value. However, the level shifter 30 may not be able to supply the current required for driving the EL lamp. In this case, a large current passes through an inverter that can supply required current. The inverter is thus driven with the output of the level shifter 30, whereby the driving output signal S15 is produced.

An EL driver having the configuration shown in FIG. 2 or 3 can theoretically drive an EL lamp. However, for causing the EL lamp 9 to glow with sufficient luminance, the EL driver must be constructed with a high-voltage semiconductor device. Taking a transistor formed with a high-voltage semiconductor device for instance, when the threshold voltage (Vth) is set to a standard value, the leakage current may increase (or the current consumption may increase) or the transistor may malfunction and fail to operate practically. For realizing a high-voltage transistor and preventing occurrence of leakage current, the threshold voltage of a transistor formed with a semiconductor device must be higher than that of an ordinary semiconductor device or must be about 1V at a minimum. When a 1.5-V silver battery or 3-V lithium battery is employed as a power source, the margin between a threshold voltage and operating voltage is as small as 0.5 to 2V. As a result, a facility, which operates normally as long as the margin between a threshold voltage and operating voltage is sufficient, fails to operate properly. This is critical, especially, to the level shifter 30 in the EL driving means 5. This problem will be described in detail in conjunction with FIG. 3.

Assuming that the output of the level shifter 30 makes a low-to-high transition, a PMOS 34 and NMOS 35 are turned on simultaneously. For enabling the level shifter 30 to achieve precise level shifting, the potential at a junction 36 between the PMOS 34 and NMOS 35, which serve as a resistive divider, must be equal to the VSS value. Otherwise, the PMOS 32 is not turned on and a high-level signal is not supplied from a terminal Q. The on-state resistance of the NMOS 35 must therefore be smaller than that of the PMOS 34. However, unless the voltage (voltage level VE1) of the driving input signal S14 is too low to create a large difference from the threshold voltage of the EL driver, the NMOS 35 is not fully turned on. The on-state resistance of the NMOS 35 does not therefore decrease fully. Consequently, the on-state resistance is not sufficiently smaller than that of the PMOS 34. As a result, the potential at the junction 36 does not have the VSS value and the level shifter fails to operate normally.

DISCLOSURE OF THE INVENTION

An object of the present invention is to solve the aforesaid problems and to provide an AC driver capable of driving a high-voltage AC driving unit using a low-voltage power source such as a battery, or more particularly, to provide a driver semiconductor device in which a level shifter serving as a driving signal shaping means for the high-voltage AC driver operates reliably and normally.

For accomplishing the above object, the present invention adopts, in principle, the technological configuration described below.

An AC driver comprises a first power source whose output has a first voltage level, an AC-driven member that is AC-driven by given high voltage, a second power source whose output has a second voltage level that is higher than the first voltage level and high enough to drive the AC-driven member, a third power source whose output has a voltage level that is intermediate between the first voltage level and second voltage level, and a driving signal supplying means for supplying a given AC driving signal to the AC-driven member.

The AC driver of the present invention, which is AC-driven by a high voltage, includes a third supply voltage producing means for producing third supply voltage that is higher than the first supply voltage and lower than the second supply voltage, and a driving signal supplying means for supplying an AC driving signal to the AC driving means that is driven by the third supply voltage (voltage level VE3). The driving signal can therefore be upgraded in two steps from the level VE1 to VE3 and from the level VE3 to VE2. Once the VE3 level is set to a value permitting reliable stepwise upgrading, even if there is no margin between the voltage level VE1 and threshold Vth, the level of the AC driving signal can be upgraded reliably. A semiconductor device that is processed to be high-voltage can be employed in the AC driver using a low-voltage power source such as a battery.

BEST MODE OF CARRYING OUT THE INVENTION

Referring to the drawings, embodiments of an AC driver in accordance with the present invention will be described in detail.

Figure 1:
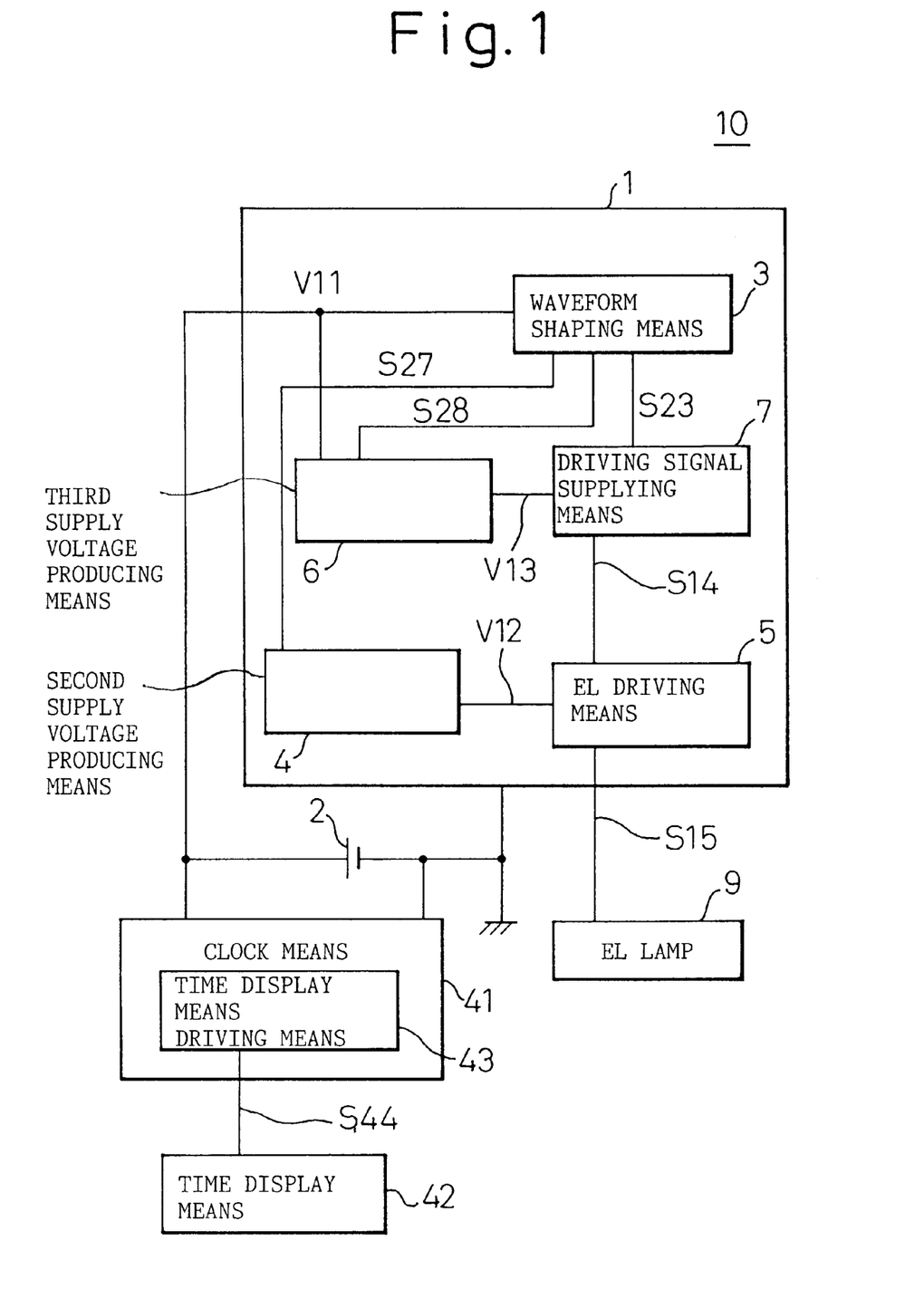
FIG. 1 is a block diagram showing the configuration of an AC driver that is an embodiment of an AC driver in accordance with the present invention.

FIG. 1 is a block diagram showing the fundamental configuration of an AC driver of the present invention. In FIG. 1, an AC driver 1 comprises an AC-driven member 9 that is AC-driven by a given high voltage, a first power source 2 whose output has a first voltage level V11, a second power source 4 whose output has a second voltage level V12 that is higher than the voltage level V11 of the output of the first power source 2 and that is high enough to drive the AC-driven member 9, a third power source 6 whose output has a voltage level V13 that is intermediate between the first voltage level V11 and second voltage level V12, and a driving signal supplying means 7 for supplying a given AC driving signal to the AC-driven member 9 when driven by voltage of the third voltage level V13 supplied from the third power source 6. An AC driving system 10 comprises the AC driver 1, and a clock means 41 including an oscillator means 53.

In the AC driving system 10 including the AC driver 1 of the present invention, the AC-driven member 9 may be, as mentioned above, any driven means that is AC-driven by a given high voltage but is not limited to any particular device. The AC-driven member 9 is, for example, an EL lamp means that glows owing to an EL device.

In an embodiment described below, an EL device is used as the AC-driven member 9. However, the present invention is not restricted to the EL device.

In the AC driver 1 of the present invention shown in FIG. 1, the first power source is a battery whose output voltage ranges, for example, from about 1.5 to about 3V.

In the AC driver 1 of the present invention, as shown in FIG. 1, the clock means 41 including a time display means driving means 43 for driving a time display means 42 is installed as an external circuit separately from the main body of the AC driver 1. When the AC driving system 10 composed of the AC-driven member 9, AC driver 1, and clock means 41 is used as a clock that is a timing device, the clock means 41 supplies a clock that is a kind of signal to the time display means 42. The clock means 41 also supplies a system clock required for driving the system of the entire AC driver.

In the AC driver 1 of the present invention, the driving signal supplying means 7 receives voltage at the third voltage level V13 from the third supply voltage producing means 6 constituting the third power source and supplies a driving signal S14. The output S14 is fed as a driving signal S15 to the EL lamp 9 via a driving means 5 included in the AC driver and driven by voltage of the second voltage level V12 provided by the second supply voltage producing means 2 serving as the second power source.

Preferably, the driving signal supplying means 7 employed in the present invention includes, for example, a known level shifter or the like.

Referring to FIG. 1, the more practical configuration and operations of the AC driving system 10 including the AC driver 1 of the present invention will be described by taking an EL driver as an example.

FIG. 1 is a block diagram showing the configuration of an EL driver 1 of an embodiment. Circuit elements identical to those in FIG. 2 are assigned the same reference numerals, and no mention will be made of the circuit elements. In this embodiment, a third supply voltage producing means 6 and a driving signal supplying means 7 are added to the circuit elements of a known AC driver. The third supply voltage producing means 6 supplies third supply voltage V13 (voltage level VE3) to the driving signal supplying means 7. The driving signal supplying means 7 converts the amplitude of an original driving signal S23 provided by the waveform shaping means 3 from the level VE1 to VE3, and supplies a driving input signal S14 to an EL driving means 5.

Figure 4:
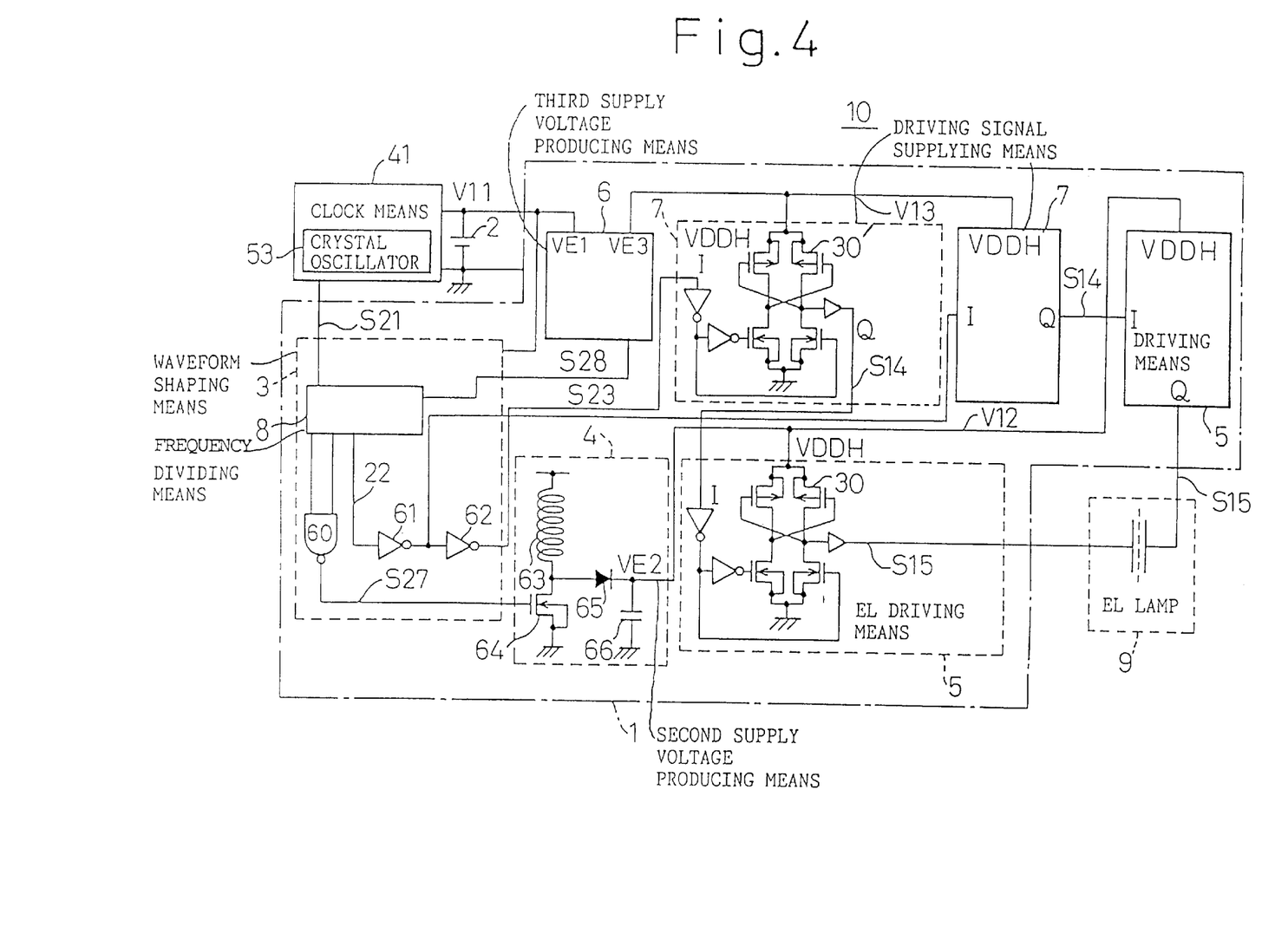
FIG. 4 is a schematic diagram showing the circuitry for an AC driver having the configuration of an AC driver in accordance with the present invention in FIG. 1.
Figure 6:
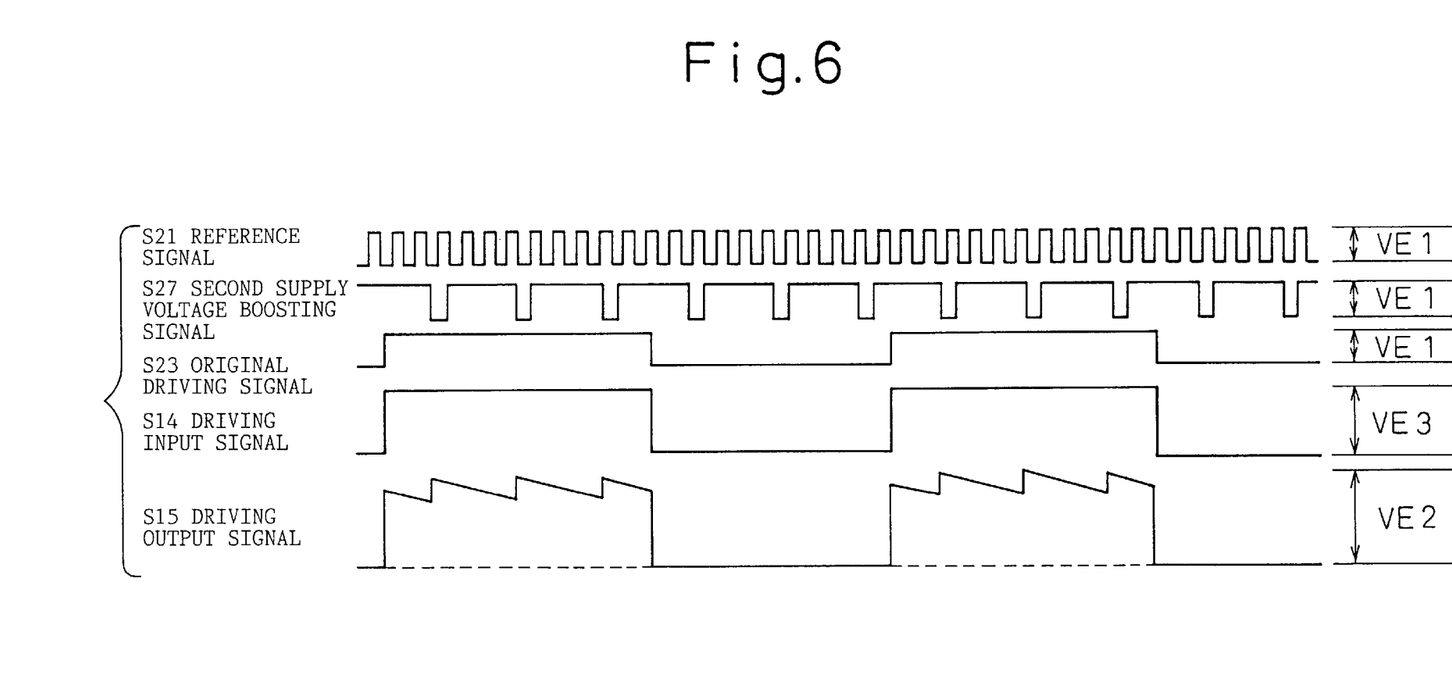
FIG. 6 is a timing charge concerning FIG. 4.

The configuration of the EL driver 1 will be described in detail in conjunction with the drawings. FIG. 4 is a schematic diagram showing the circuitry of an embodiment having the system configuration shown in FIG. 1. Circuit elements identical to those in FIG. 3 are assigned the same reference numerals, and no mention will be made of the circuit elements. FIG. 6 is a timing chart concerning an EL driver 1 of the present invention shown in FIG. 4. Reference numeral 6 denotes a third supply voltage producing means whose circuitry will be detailed later. 7 denotes a driving signal supplying means including, for example, a level shifter 30. S23 denotes an original driving signal corresponding to the driving input signal S14 in FIG. 3. S14 denotes a driving signal input signal whose amplitude differs from that of the driving input signal S14 in FIG. 3. S23 denotes a third supply voltage boosting signal provided by a frequency dividing means 8.

The third supply voltage producing means 6 produces third supply voltage V13 on receipt of the first supply voltage V11 and third supply voltage boosting signal S23 and applies the third supply voltage V13 to the driving signal supplying means 7. As shown in FIG. 6, the driving signal supplying means 7 upgrades the amplitude of the original driving signal S23 provided by the waveform shaping means 3 from the level VE1 to VE3. The driving input signal S14 having an increased amplitude is applied to the EL driving means 5 and the voltage thereof is increased to the level Ve2. The level VE3 must be set to a value permitting stable increasing from the level VE1 to VE3 by the driving signal supplying means 7 and also permitting stable increasing from the level VE3 to VE2 by the EL driving means 5. The increasing from the level VE1 to VE3 by the driving signal supplying means 7 is accomplished under the condition that the output voltage of the driving signal supplying means 7 is several volts at maximum. The increasing from the level VE3 to VE2 by the EL driving means 5 is accomplished under the condition that the input voltage of the EL driving means 5 is only several volts. Consequently, the level VE3 is set to several volts.

In the AC driver 1 of the present invention, as mentioned above, the first power source should preferably be a small-sized battery. The second power source includes the second supply voltage producing means 4 and has the ability to step up the voltage level of the output of the third supply voltage producing means 6 constituting the third power source that will be described later, which is an intermediate voltage level, into a voltage level that is high enough to drive the AC-driven member 9 such as an EL lamp means.

Figure 10:
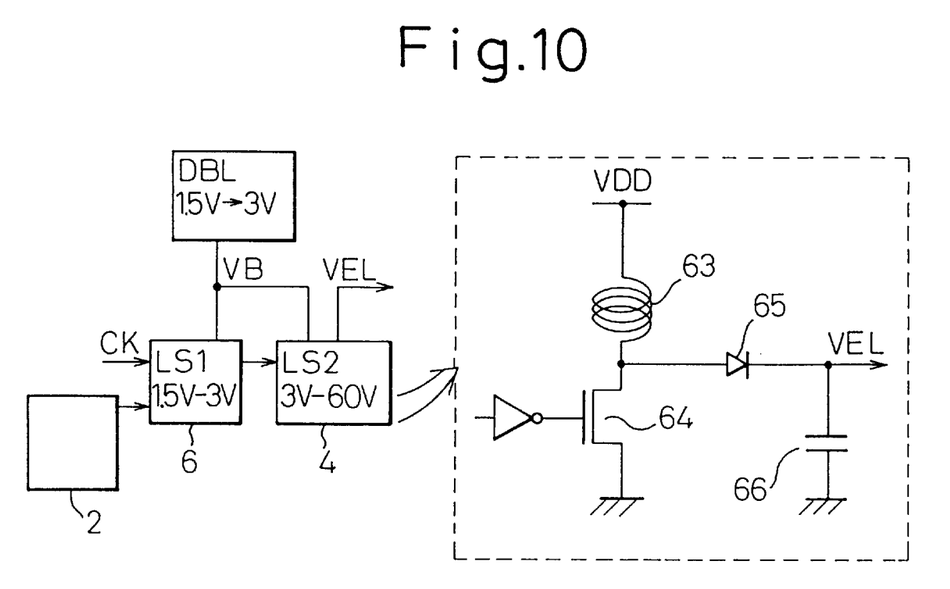
FIG. 10 is a block diagram showing an example of a second supply voltage producing means for a second power source employed in an AC driver in accordance with the present invention.

The second power source 4 should preferably, as illustrated, include a coil step-up circuit. A practical example of the circuitry is shown in FIG. 10. Specifically, assuming that the voltage level of the output of the first power source is 1.5V, when the voltage level of the output of the second power source must be 60V, the third power source generates 60V by using the driving signal 3V output from the battery from 1.5V to 3.0V and the second power source 4 steps up the output of the third power source 6.

Figure 7:
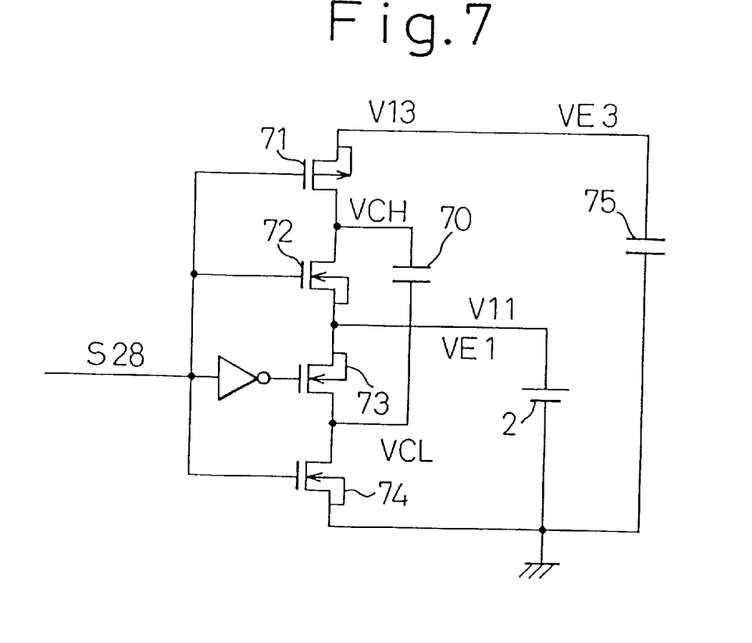
FIG. 7 shows the configuration of an embodiment of a third supply voltage producing means 6 employed in the present invention.
Figure 8:
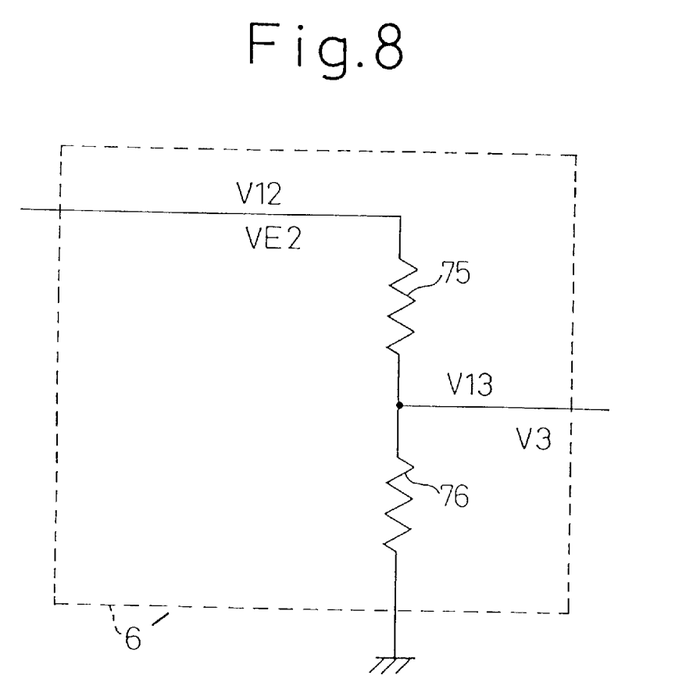
FIG. 8 shows the configuration of another embodiment of the third supply voltage producing means 6 employed in the present invention.

A multiplicative step-up circuit for driving capacitors on a time-sharing basis shown in FIG. 7 or a resistive divider shown in FIG. 8 is conceivable as a circuit for realizing the third supply voltage producing means 6 constituting the third power source employed in the present invention. In the circuit shown in FIG. 7, the third supply voltage boosting signal S28 is used to turn on or off MOSs 71 to 73. Thus, the third supply voltage V13 that is twice as high as the first supply voltage V11 is produced. First, the MOSs 72 and 74 are turned on and the MOSs 71 and 73 are turned off. The potential difference corresponding to the first supply voltage V11 is then stored in a step-up capacitor 70. Next, the MOSs 71 and 73 are turned on and the MOSs 72 and 74 are turned off. This causes the potential at a terminal VCL of the step-up capacitor 70 to become equal to the first supply voltage V11. As a result, the potential at a terminal VCH becomes twice as high as the first supply voltage V11. By repeating this sequence, a voltage that is twice as high as the first supply voltage V11 is stored in a supply capacitor 75 and can be used as the third supply voltage V13.

FIG. 8 shows an example of the third supply voltage producing means 6 for producing the third supply voltage V13 using a resistive divider as mentioned above. The resistances of two resistors 75 and 76 are determined appropriately, and second supply voltage V12 is used to produce the third supply voltage V13. Unlike the circuit shown in FIG. 7, this circuit has the advantage of producing the third supply voltage V13 of any value. However, there is a drawback that feedthrough current flows without fail.

Figure 11:
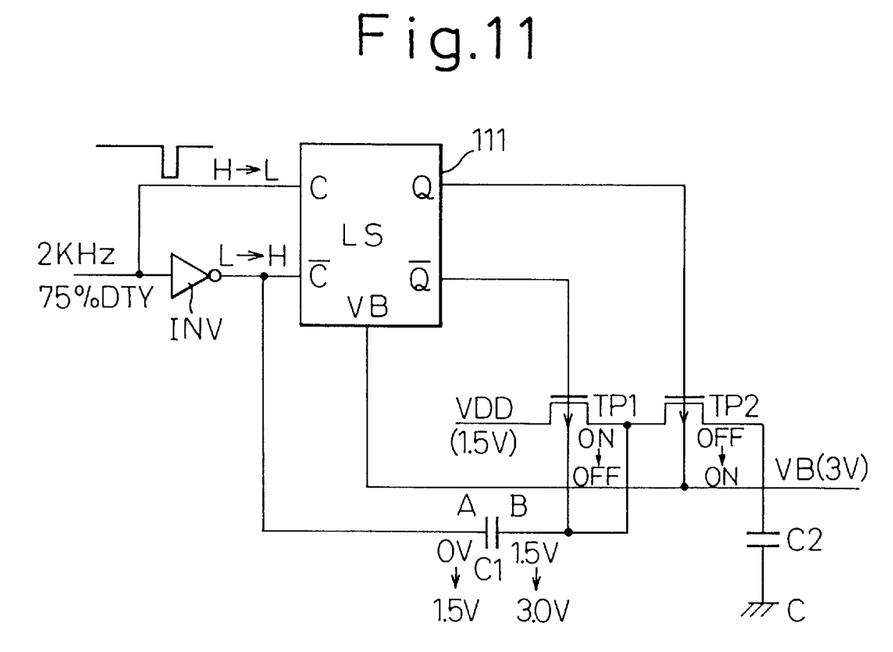
FIG. 11 is a block diagram showing an example of a third supply voltage producing means for a third power source employed in the AC driver in accordance with the present invention.

Another circuit for realizing the third supply voltage producing means 6 constituting the third power source in accordance with the present invention may be a multiplicative step-up circuit having the elements shown in FIG. 11.

To be more specific, the third supply voltage producing means 6 comprises a level shifter 111, transistors TP1 and TP2, capacitors C1 and C2, and an inverter INV which are interconnected as illustrated. Voltage VDD of 1.5V is applied to one end of the transistor TP1. A signal having a frequency of 2 kHz and a duty ratio of 75% is applied as a boosting signal to the input terminals C and $\overline{C}$ of the level shifter 111.

When the boosting signal is driven high, the transistor TP1 is turned on and the transistor TP2 is turned off.

As a result, 0V and 1.5V are applied to the terminals A and B of a capacitor C1 respectively. In other words, voltage of 1.5V is stored in the capacitor C1.

When the boosting signal is driven low, the transistor TP1 is turned off and the transistor TP2 is turned on.

As a result, 1.5V is applied to each of the terminals A and B of the capacitor 1. Thus, the voltage of 1.5V is stored in the capacitor 1. However, since the capacitor 1 has held a potential difference of 1.5V, the potential at the terminal B becomes 3V.

With the potential, voltage of 3V is placed in a capacitor C2 via the transistor TP2.

By repeating the foregoing operation, voltage of 3V can be accumulated in the capacitor C2.

The third power source in accordance with the present invention may include a capacitor step-up circuit. In this case, the voltage level of the output of the third power source is set to be an integral (N) multiple of the voltage level of the output of the first power source.

The integer (N) in the "integral multiple" described relative to the voltage level of the output of the third power source including a capacitor step-up circuit is preferably set to, for example, 2 or 3.

In the aforesaid AC driver of the present invention, the voltage levels of outputs of power sources can be set to any value. Preferably, the first voltage level of the output of the first power source 2 should be 1.5V, the third voltage level of the output of the third power source 6 should be twice to three times as high as the first voltage level, and the second voltage level of the output of the second power source 4 should be thirty to forty times as high as the first voltage level. This is because it is one of the objects of the present invention to provide a high voltage of about 60 to 80V using a small-sized battery.

Figure 9:
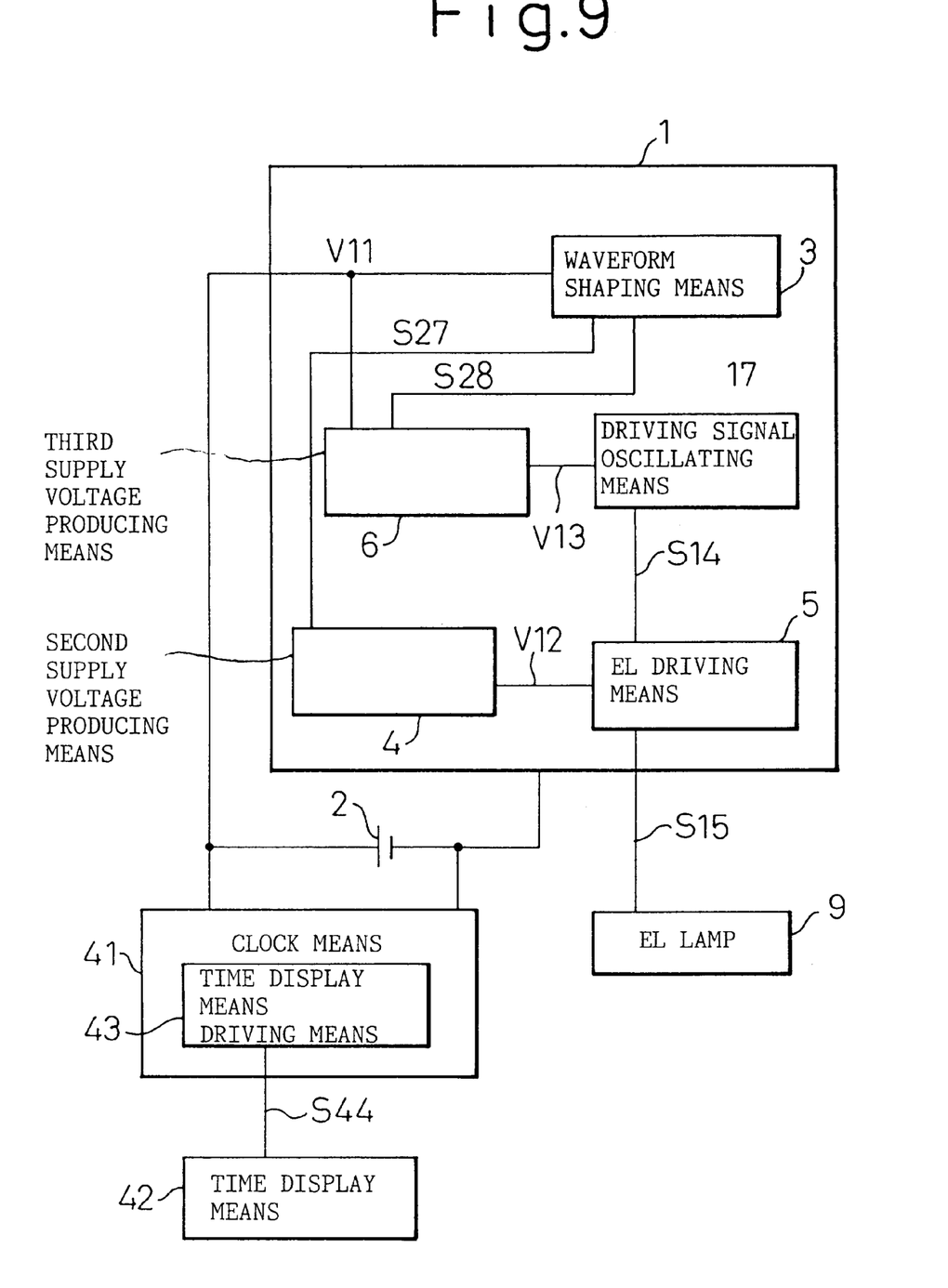
FIG. 9 is a block diagram showing the configuration of an AC driver of another embodiment of the present invention.

An AC driver of the present invention has been described on the basis of the configuration shown in FIG. 1. Aside from the configuration shown in FIG. 1, another embodiment of an AC driver of the present invention can be devised. For example, another embodiment has the configuration shown in FIG. 9. In the embodiment shown in FIG. 9, the fundamental configuration is identical to that in the embodiment shown in FIG. 1. However, there is a difference that a driving signal oscillating means 17 that oscillates in response to the third supply voltage V13 and supplies the driving input signal S14 is used on behalf of the driving signal supplying means 7 for shaping the original driving signal S23 provided by the waveform shaping means 3. In this embodiment, the driving signal oscillating means 17 may be realized with an astable multivibrator or the like.

Next, another embodiment of the AC driving system of the present invention will be described with reference to FIG. 12.

Figure 12:
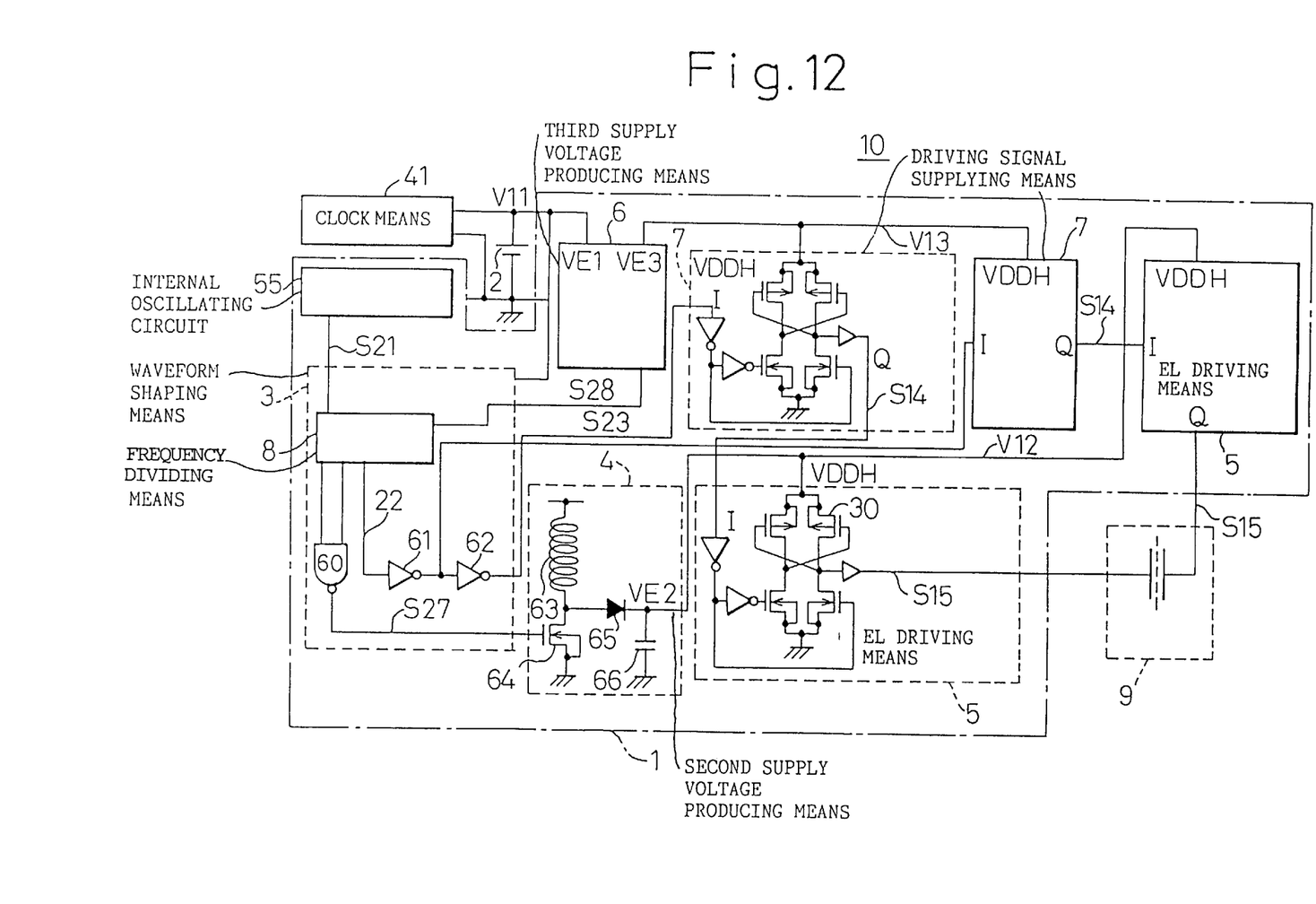
FIG. 12 is a block diagram showing the configuration of yet another embodiment of an AC driver in accordance with the present invention.

FIG. 12 shows another embodiment of the AC driving system 10 composed of the AC driver 1 of the present invention and clock means 41. The fundamental configuration is identical to that of the AC driving system 10 shown in FIG. 4. A difference lies in that: in the embodiment shown in FIG. 4, the oscillating means 53 realized with a crystal oscillator is incorporated in the clock means 41 installed as an external circuit of the AC driver 1; while in this embodiment, the oscillating means 55 is separated from the clock means 41 and realized as a circuit element of the AC driver 1.

The oscillating means 55 is not limited to a specific circuit but may be a known CR oscillator circuit or the like.

The oscillating means in accordance with the present invention shares a clock that is a kind of signal with a clock that is a timing device irrespective of whether it is installed as an external circuit of the AC driver 1 or as a circuit element thereof.

According to the present invention, in any of the embodiments shown in FIGS. 4 and 12, the oscillating means 53 or 55 supplies a given clock to each of at least the second power source 4, third power source 6, and driving signal supplying means 7.

The frequency of a clock fed to each of the second power source 4 and third power source 6 should preferably be set to the range from 1 to 15 kHz. The frequency of a clock fed to the driving signal supplying means 7 should preferably be set to the range from 100 to 500 Hz.

According to the present invention, a clock for use in driving the second power source 4 may be used for driving the third power source 6.

Figure 13:
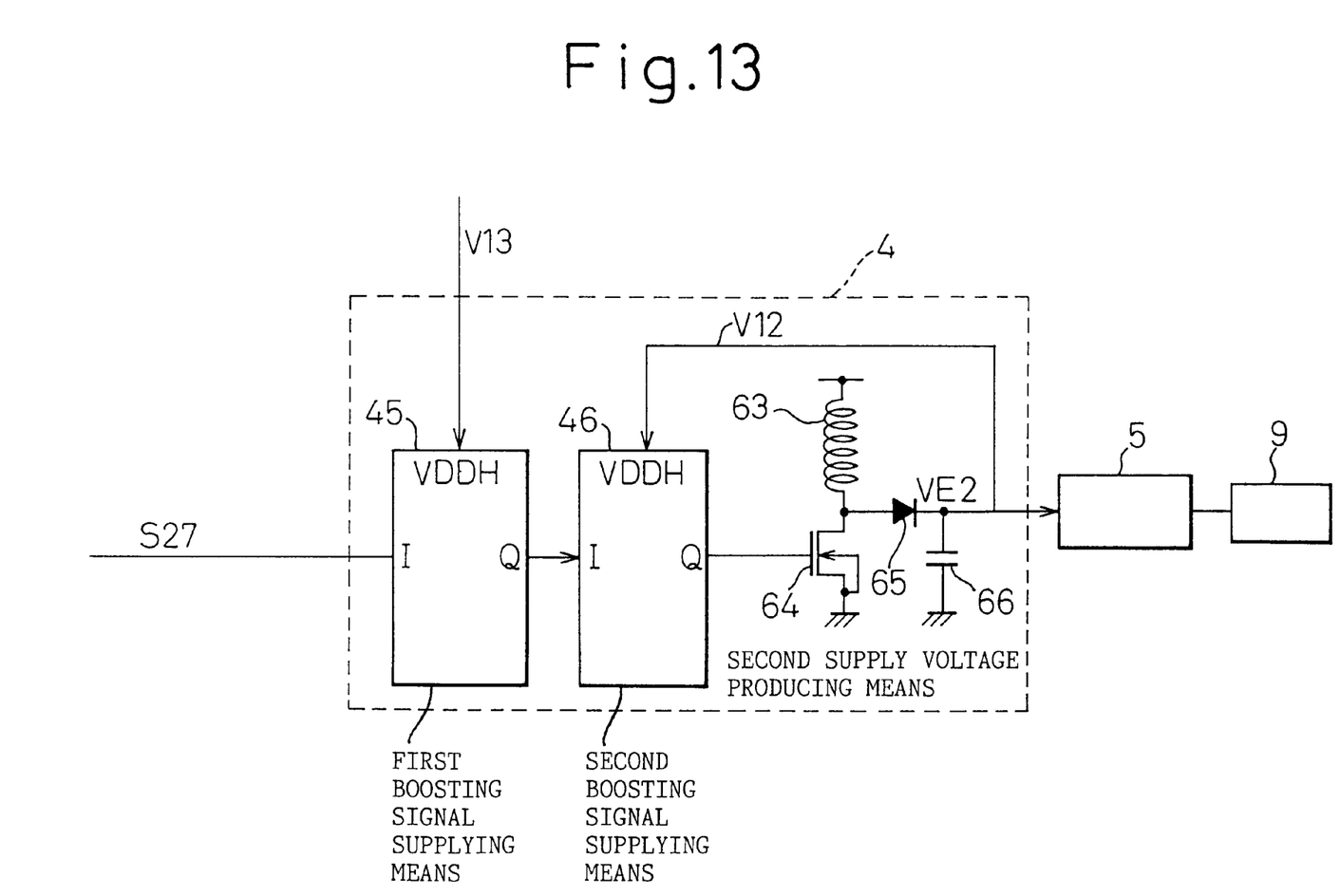
FIG. 13 is a block diagram showing yet another example of a second supply voltage producing means employed in the AC driver in accordance with the present invention.

FIG. 13 is a block diagram showing the configuration of yet another embodiment of a second supply voltage producing means 4 serving as a second power source in accordance with the present invention. The second supply voltage producing means 4 has the same circuitry, which consists of a coil 63, a transistor 64, a diode 65, and a capacitor 66, as the second supply voltage producing means 4 shown in FIG. 4. The second supply voltage producing means 4 shown in FIG. 13 further includes a first level shifter 45 for receiving a second supply voltage boosting signal S27 and third supply voltage V13, and a second level shifter 46 that receives the output of the first level shifter 45 and has the output terminal thereof connected to the gate of the transistor 64. The terminal of the second supply voltage producing means 4 for supplying charging voltage VE2 for use in charging the capacitor 66 is connected to the AC driving means 5 for driving the AC-driven member 9, and also connected to the second level shifter 46. Owing to this circuitry, the voltage in the capacitor 46 is fed back as the second supply voltage V12 to the second level shifter 46. Consequently, the second supply voltage producing means 4 can efficiently provide a high voltage.

Figure 14:
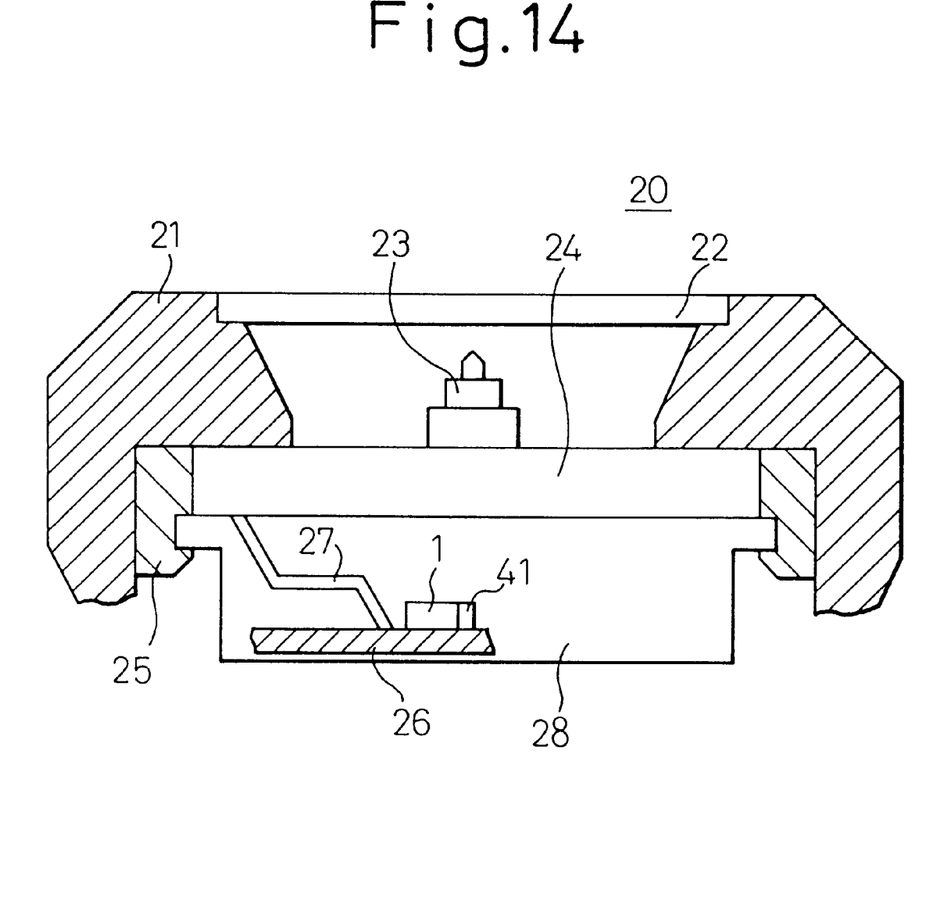
FIG. 14 is a sectional view showing an example of the structure of a clock in which an AC driver of the present invention is incorporated.

FIG. 14 is a sectional view showing the structure of an example of a clock in which the AC driving system 10 including the AC driver 1 of the present invention and employing the EL lamp means 9 as an AC-driven member is incorporated.

To be more specific, assuming that an ordinary clock 20 comprises an indicator axis 23, a housing 21, and a glass cover 22, the EL lamp means 24 is used instead of a clockface. The EL lamp means 24 is fixed to the housing 21 by means of a fixing means 25. A module accommodating an ordinary clock mechanism or a clock movement 28 is situated below the EL lamp means 24. A printed-circuit board 26 on which the AC driver 1 for driving the EL lamp means so as to cause it to glow and the appropriate clock means 41 are mounted is also placed below the EL lamp means 24. The printed-circuit board 26 is coupled with the EL lamp means 24 by way of an appropriate coupling spring 27.

According to the present invention, since a third supply voltage producing means for producing third supply voltage that is higher than first supply voltage and lower than second supply voltage, and a driving signal supplying means for supplying an AC driving signal to an EL driving means when driven by the third supply voltage are included, a driving signal can be increased in two steps from level VE1 to VE3 and level VE3 to VE2. Once the level VE3 is set to a value permitting reliable stepwise increasing, even if there is no margin between the voltage level VE1 and threshold voltage Vth, the level of the driving signal can be increased reliably. This makes it possible to construct an AC driver such as an EL driver that operates with a low-voltage power source such as a battery and that is formed with a semiconductor device which is processed to be high voltage. High voltage can therefore be applied to an EL lamp. This results in an EL driver optimal for small-sized electronic equipment which has sufficient glowing strength and limited current consumption.

What is claimed is:

1. An AC driver for driving an AC-driven member by a predetermined high voltage comprising:

a first power source having a first output at a first voltage level;

a second power source connected to receive the first output of the first power source and having a second output at a second voltage level that is higher than the first voltage level;

a third power source connected to receive the first output of the first power source and having a third output at a third voltage level that is higher than the first voltage level but lower than the second voltage level;

driving signal supplying means connected to receive and be driven by the third output and to output a predetermined AC driving signal; and driving means, connected to receive the second output and the predetermined AC driving signal, for driving said AC-driven member at the predetermined high voltage.

2. The AC driver according to claim 1, wherein said first power source is a battery.

3. The AC driver according to claim 1, wherein said AC-driven member is an electroluminescent device.

4. The AC driver according to any one of claims 2, 3, or 1, including a watch with which the AC driver is used.

5. The AC driver according to any one of claims 2, 3 or 1, wherein said driving signal supplying means includes a level shifter which generates the AC driving signal in response to receipt of the third voltage level.

6. The AC driver according to claim 1, wherein said second power source includes a voltage step-up circuit for generating said second voltage level.

7. The AC driver according to claim 1, wherein said third power source includes a capacitor step-up circuit for generating said third voltage level.

8. The AC driver according to claim 7, wherein said third voltage level at the output of said third power source is set to an integral (N) multiple of said first voltage level at the output of said first power source.

9. The AC driver according to claim 8, wherein said integral (N) multiple equals to 2 or 3.

10. The AC driver according to claim 1, wherein said third power source includes a voltage setting means having a resistive divider for receiving the first output and providing the third output.

11. The AC driver according to claim 1, wherein said first voltage level of the output of said first power source is set to 1.5V, said third voltage level of the output of said third power source is set to be twice to three times as high as said first voltage level, and said second voltage level of the output of said second power source is set to be thirty to forty times as high as said first voltage level.

12. The AC driver according to claim 1, wherein said driving signal supplying means is an oscillating means.

13. The AC driver according to claim 1, further comprising a second oscillating means for generating a clock signal to said AC driver.

14. The AC driver according to claim 12, wherein said second oscillating means is mounted within said AC driver.

15. The AC driver according to claims 13 or 14 further comprising a timing device and wherein said clock signal generated by said second oscillating means is also provided to said timing device.

16. An AC driver for driving an AC-driven member by a predetermined high voltage comprising:

a first power source having a first output at a first voltage level;

a second power source for generating a second voltage level which is higher than said first voltage level and having a second output on which the second voltage level is provided;

a third power source for generating a third voltage level at an intermediate voltage level between the first voltage level and the second voltage level, and having a third output on which the third voltage level is provided;

driving signal supplying means powered by said third power source for outputting a first AC driving signal having an amplitude at substantially said third voltage level; and driving means powered by said second power source and supplied with said first AC driving signal for outputting a second AC driving signal having an amplitude at substantially said second voltage level for driving said AC-driven member.

17. The AC driver according to claim 14, wherein said oscillating means is a CR oscillator circuit.

18. The AC driver according to claim 13, wherein said clock signal of said second oscillating means is supplied to at least said second power source, third power source, and driving signal supplying means.

19. The AC driver according to claim 18, wherein the frequency of a clock signal supplied to each of said second power source and third power source is set to the range from 1 to 15 kHz, and the frequency of a clock signal supplied to said driving signal supplying means is set to the range from 100 to 500 Hz.

20. The AC driver according to claim 19, wherein the clock signal is used to drive said second power source and said third power source.

* * * * *

UNITED STATES PATENT AND TRADEMARK OFFICE
CERTIFICATE OF CORRECTION

PATENT NO. : 6,118,219
DATED : September 12, 2000
INVENTOR(S) : Tomio Okigami et al.

It is certified that error appears in the above-identified patent and that said Letters Patent is hereby corrected as shown below:

Claim 14, Column 10,
Line 39, "claim 12" should read --claim 13--.

Signed and Sealed this

Third Day of July, 2001

Attest:

*Nicholas P. Godici*

NICHOLAS P. GODICI
*Attesting Officer*     *Acting Director of the United States Patent and Trademark Office*